United States Patent [19]

Phillion

[11] Patent Number: 5,681,051
[45] Date of Patent: Oct. 28, 1997

[54] DEPLOYMENT DOOR ASSEMBLY

[75] Inventor: Jack A. Phillion, Shelby Township, Mich.

[73] Assignee: TRW Vehicle Safety Systems Inc., Lyndhurst, Ohio

[21] Appl. No.: 462,805

[22] Filed: Jun. 5, 1995

[51] Int. Cl.⁶ ............................... B60R 21/16
[52] U.S. Cl. ........................ 280/728.3; 280/732
[58] Field of Search ............... 280/728.3, 728.1, 280/732, 731, 728.2

[56] References Cited

U.S. PATENT DOCUMENTS

| | | |
|---|---|---|
| 5,082,310 | 1/1992 | Bauer . |
| 5,087,067 | 2/1992 | Seki et al. . |
| 5,135,252 | 8/1992 | Suran et al. ............... 280/732 |
| 5,145,207 | 9/1992 | Bederka et al. . |
| 5,154,444 | 10/1992 | Nelson . |
| 5,158,322 | 10/1992 | Sun . |
| 5,320,380 | 6/1994 | Hamada et al. . |
| 5,330,223 | 7/1994 | Hiramitsu et al. . |
| 5,333,901 | 8/1994 | Barnes . |
| 5,335,935 | 8/1994 | Proos et al. . |
| 5,338,060 | 8/1994 | Soderquist . |
| 5,362,096 | 11/1994 | Satoh et al. ............... 280/728.3 |
| 5,375,874 | 12/1994 | Zushi . |
| 5,378,014 | 1/1995 | Cooper . |
| 5,403,033 | 4/1995 | Koma . |
| 5,460,403 | 10/1995 | Hansen et al. . |
| 5,470,634 | 11/1995 | Persson et al. ............. 280/728.3 |
| 5,474,323 | 12/1995 | Davidson . |
| 5,478,105 | 12/1995 | Yamakawa et al. . |
| 5,482,313 | 1/1996 | Ikeya et al. . |
| 5,527,063 | 6/1996 | Garner et al. . |

FOREIGN PATENT DOCUMENTS

| | | |
|---|---|---|
| 395879 | 11/1992 | Japan . |
| 6-107103 | 4/1994 | Japan ............. 280/731 |
| 2265119 | 9/1993 | United Kingdom . |
| 2265338 | 9/1993 | United Kingdom . |

*Primary Examiner*—Eric D. Culbreth
*Attorney, Agent, or Firm*—Tarolli, Sundheim, Covell, Tummino & Szabo

[57] ABSTRACT

A deployment door assembly (28) covers an inflatable air bag (12) contained in a reaction canister (24) in a vehicle (16). The deployment door assembly (28) is a part which has a panel portion (30), wall portions (180–188), and mounting portions (54). The panel portion (30) closes an opening (49) in the vehicle (16). The panel portion (30) has a peripheral edge surface (80), and includes a deployment door (32) which is spaced fully from the peripheral edge surface (80). The wall portions (180–188) direct the inflating air bag (12) to move outward from the reaction canister (24) toward the deployment door (32). The wall portions (180–188) surround the deployment door (32) and project inward from the panel portion (30). The mounting portions (54) mount the deployment door assembly (28) on the vehicle (16) at locations spaced from the reaction canister (24). The mounting portions (54) project inward from the panel portion (30) at locations between the wall portions (180–188) and the peripheral edge surface (80).

6 Claims, 6 Drawing Sheets

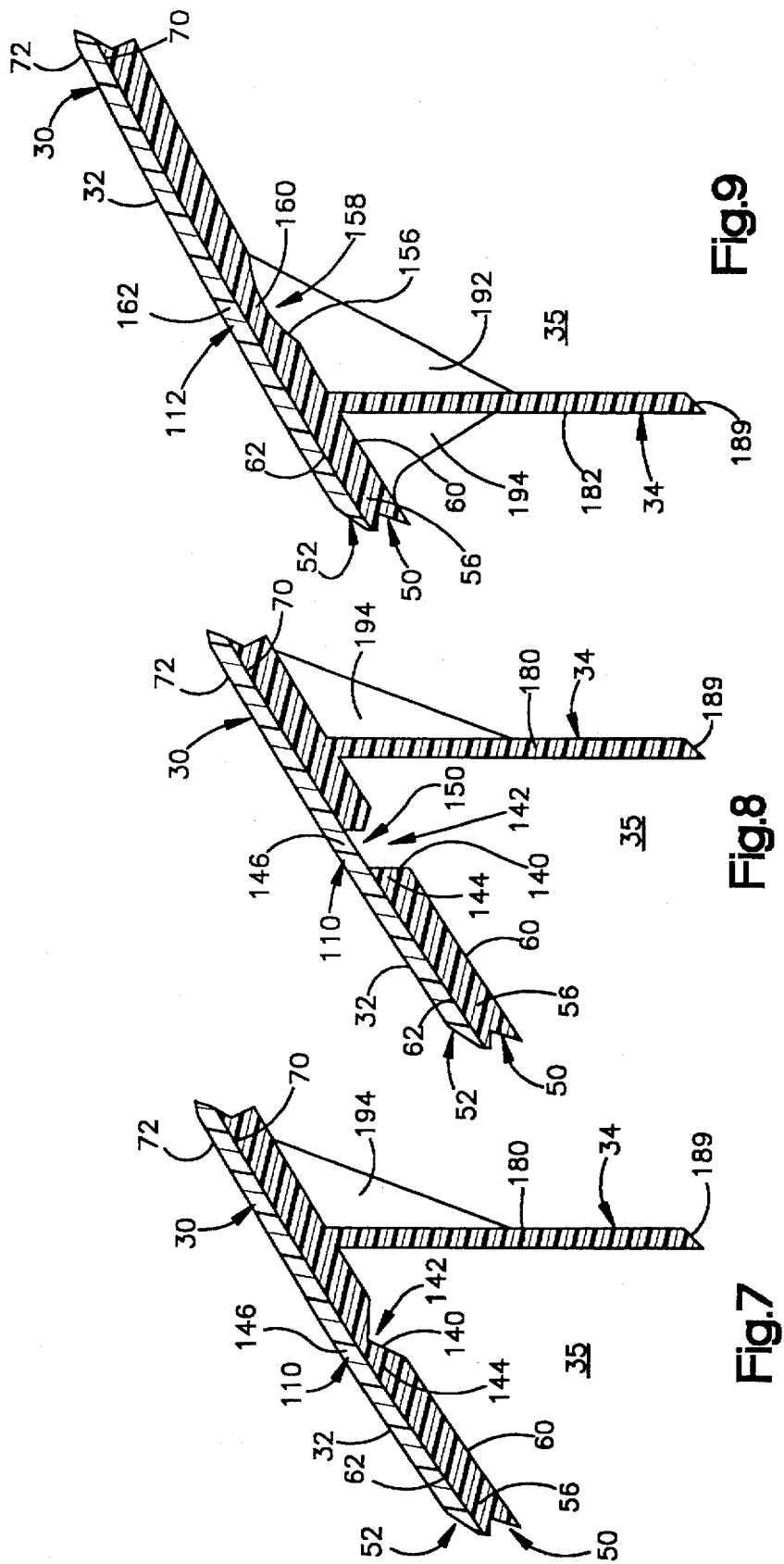

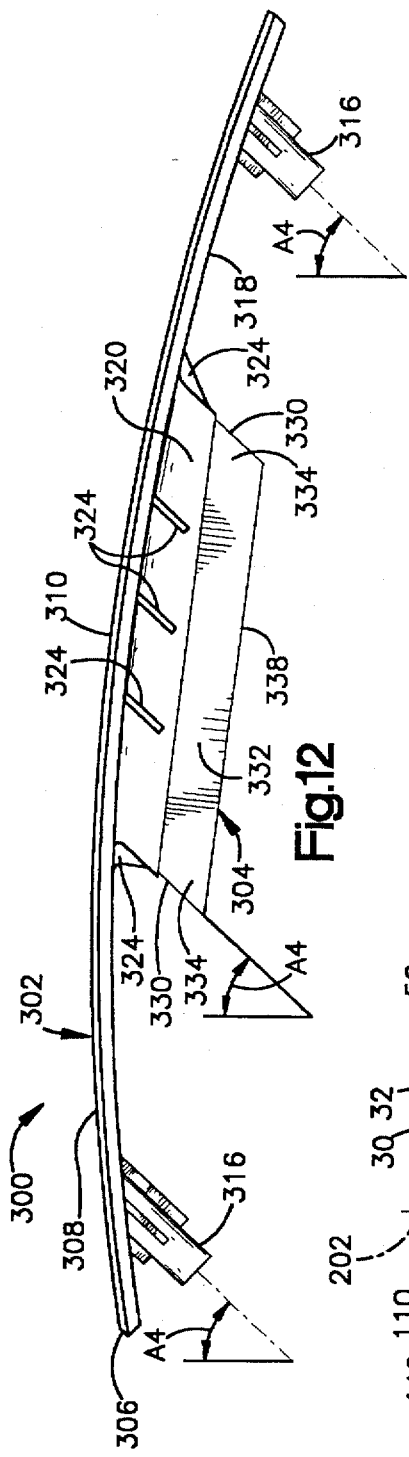
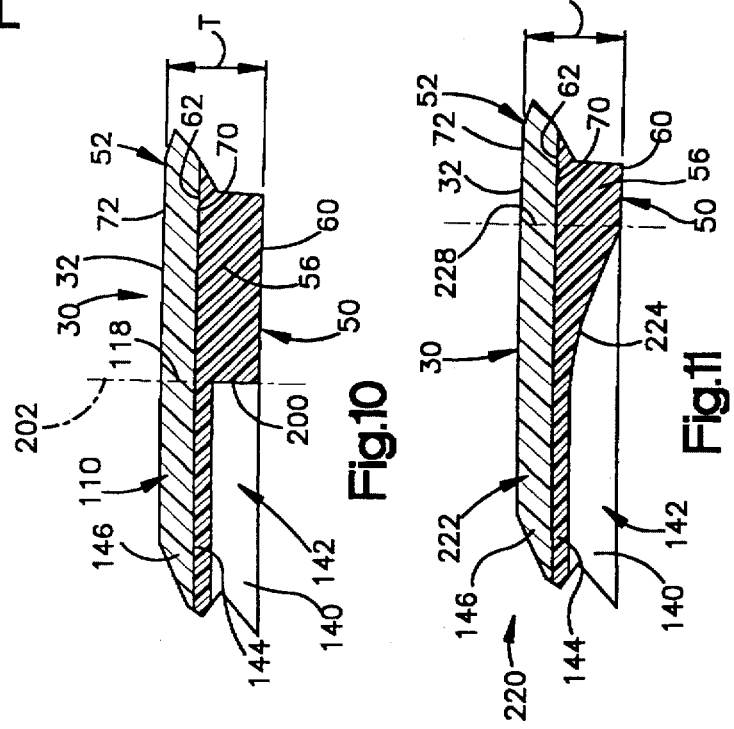

DEPLOYMENT DOOR ASSEMBLY

FIELD OF THE INVENTION

The present invention relates to a deployment door which is opened upon inflation of an air bag in a vehicle.

BACKGROUND OF THE INVENTION

An air bag is inflated to protect an occupant of a vehicle upon the occurrence of a vehicle collision. When the vehicle experiences a collision-indicating condition of at least a predetermined threshold level, an inflator is actuated. The inflator then emits inflation fluid which is directed to flow into the air bag. The inflation fluid inflates the air bag to an inflated condition in which the air bag extends into the vehicle occupant compartment. When the air bag is inflated into the vehicle occupant compartment, it restrains the occupant of the vehicle from forcefully striking parts of the vehicle as a result of the collision.

The air bag and the inflator are typically assembled together as parts of an air bag module which is mounted in the vehicle. In addition to the air bag and the inflator, the module includes a reaction canister which contains the air bag and the inflator. The reaction canister has a deployment opening through which the air bag emerges from the reaction canister when the air bag is inflated.

A deployment door extends over the deployment opening in the reaction canister to conceal the air bag and the other parts of the module from the vehicle occupant compartment. The deployment door may be a part of the module. Alternatively, the deployment door may be a part of a trim panel on the vehicle structure in which the module is mounted. For example, the deployment door may be a part of a trim panel on the vehicle instrument panel.

When the inflator is actuated, the reaction canister directs the inflation fluid to flow from the inflator into the air bag. As the inflation fluid enters the air bag, it moves the air bag outward from the reaction canister through the deployment opening and forcefully against the deployment door. The deployment door is ruptured by the force of the fluid pressure in the air bag, and is thus released for movement away from the deployment opening. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag inflates outward from the reaction canister through the deployment opening and into the vehicle occupant compartment.

SUMMARY OF THE INVENTION

The present invention comprises a deployment door assembly for covering an inflatable occupant restraint in a vehicle. Specifically, the deployment door assembly covers an inflatable occupant restraint contained in a canister in a vehicle. In accordance with the present invention, the deployment door assembly comprises a part having a panel portion, wall portions, and mounting portions.

The panel portion of the part comprises means for closing an opening in the vehicle. The panel portion has a peripheral edge surface, and includes a deployment door which is spaced fully from the peripheral edge surface.

The wall portions of the part comprise means for directing the inflatable restraint to move outward from the canister toward the deployment door when the inflatable restraint is inflating. The wall portions surround the deployment door, and project inward from the panel portion.

The mounting portions of the part comprise means for mounting the part on the vehicle at locations spaced from the canister. The mounting portions project inward from the panel portion at locations between the wall portions and the peripheral edge surface.

In a preferred embodiment of the present invention, the deployment door assembly is defined by two plastic pieces that are joined together. One plastic piece is a substrate. The other plastic piece is an outer layer which overlies the substrate. The substrate is a continuous piece of a first plastic material. The outer layer is a continuous piece of a second, less rigid plastic material.

The substrate in the preferred embodiment of the present invention includes several portions of the deployment door assembly. These include the mounting portions, the wall portions, and the inner side surface of the panel portion. The outer layer includes an outer side surface of the panel portion. The outer side surface comprises means for continuing the trim theme of the vehicle across and around the deployment door.

BRIEF DESCRIPTION OF THE DRAWINGS

Further features of the present invention will become apparent to those skilled in the art to which the present invention relates from reading the following description with reference to the accompanying drawings, in which:

FIG. 7 is a view taken on line 7—7 of FIG. 5;

FIG. 8 is a view taken on line 8—8 of FIG. 5;

FIG. 9 is a view taken on line 9—9 of FIG. 5;

FIG. 10 is a view taken on line 10—10 of FIG. 5;

FIG. 11 is a view similar to FIG. 10 showing parts of an apparatus comprising a second embodiment of the present invention; and FIGS. 12 and 13 are views similar to FIGS. 4 and 7 showing parts of an apparatus comprising a third embodiment of the present invention.

DESCRIPTION OF PREFERRED EMBODIMENT

Figure 1:
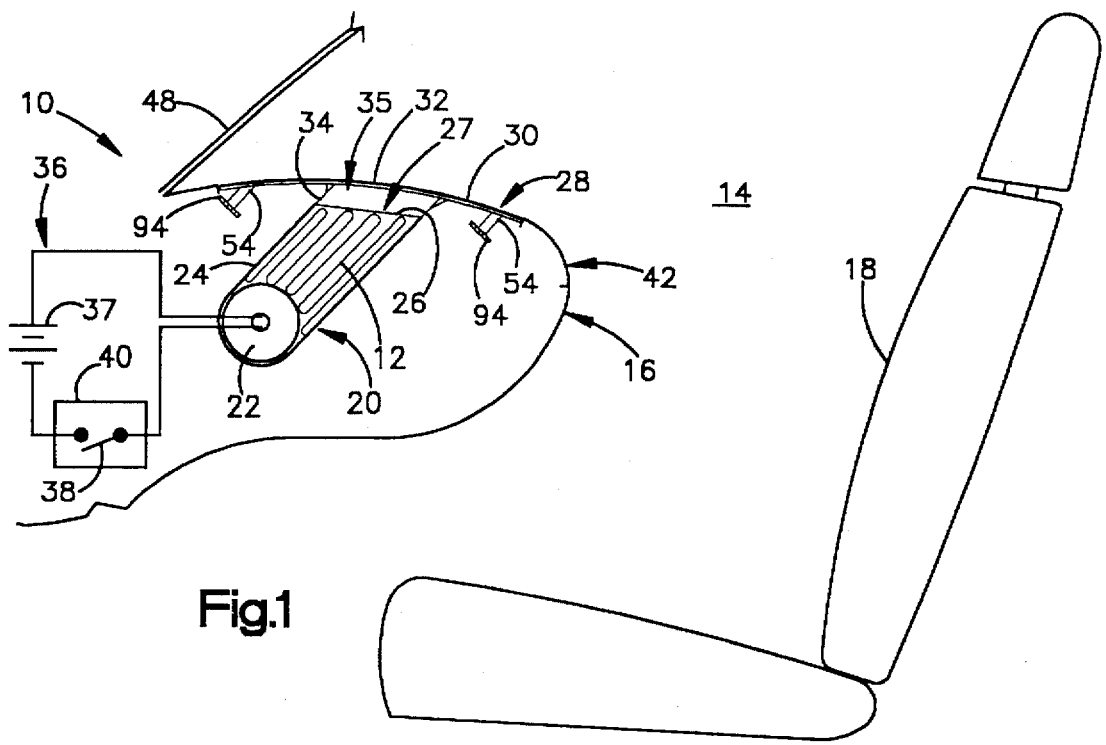
FIG. 1 is a schematic view showing a vehicle occupant restraint apparatus comprising a first embodiment of the present invention.
Figure 2:
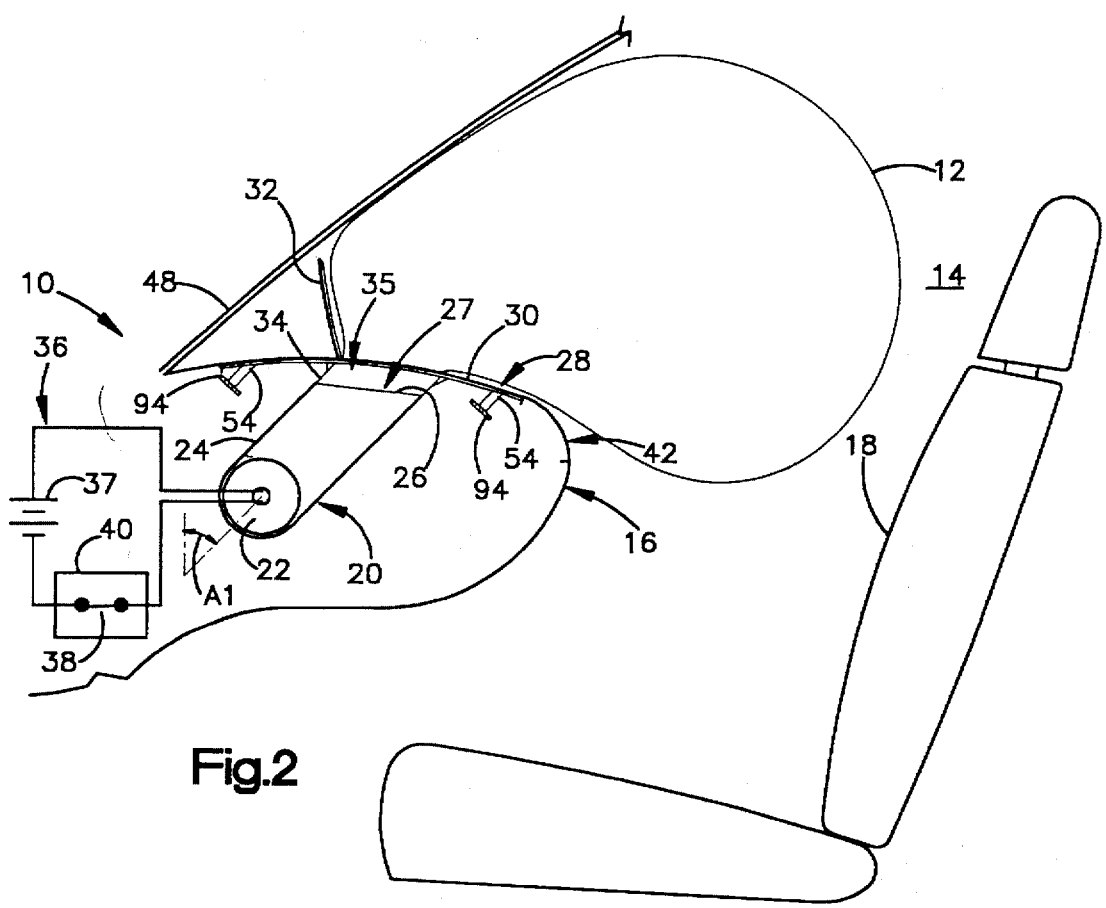
FIG. 2 is a schematic view showing the apparatus of FIG. 1 in an actuated condition.

As shown schematically in FIGS. 1 and 2, a vehicle occupant restraint apparatus 10 comprising a first embodiment of the present invention includes an inflatable vehicle occupant restraint 12, which is commonly referred to as an air bag. The air bag 12 is inflatable from an uninflated condition, as shown in FIG. 1, to an inflated condition, as shown in FIG. 2. When the air bag 12 is inflated, it moves into the vehicle occupant compartment 14 between the vehicle instrument panel 16 and an adjacent vehicle seat 18. The air bag 12 then restrains movement of an occupant of the seat 18 toward the instrument panel 16 to help protect the occupant from a forceful impact with the instrument panel 16 or other parts of the vehicle.

The air bag 12 is part of an air bag module 20 which is mounted in the instrument panel 16 at the passenger side of the vehicle. In addition to the air bag 12, the module 20 includes an inflator 22 for inflating the air bag 12, and includes a reaction canister 24 which contains the air bag 12 and the inflator 22. The air bag 12 and the inflator 22 are fixed to the reaction canister 24 in a known manner, and the reaction canister 24 is mounted in the instrument panel 16 in a known manner. An outer end 26 of the reaction canister 24 is open so as to define a deployment opening 27 through which the air bag 12 emerges from the reaction canister 24 when inflating. Although the reaction canister 24 in the preferred embodiments of the present invention is a separate structure which is mounted in the instrument panel 16, such a canister could alternatively be defined by the structure of the instrument panel 16, by another part of the vehicle from which the air bag 12 is to be inflated into the vehicle occupant compartment 14.

The apparatus 10 further includes a deployment door assembly 28 which is mounted on the instrument panel 16. The deployment door assembly 28 includes a deployment panel 30 which, in turn, includes a deployment door 32. The deployment panel 30 covers the module 20 to conceal the module 20 from the vehicle occupant compartment 14. The deployment door 32 is pivotal from a closed position, as shown in FIG. 1, to an opened position, as shown in FIG. 2. A base 34 of the deployment door assembly 28 extends inward from the deployment panel 30 to the module 20. The base 34 defines a chute 35 through which the inflating air bag 12 moves from the deployment opening 27 to the deployment door 32.

The inflator 22 comprises a source of inflation fluid for inflating the air bag 12. As known in the art, the inflator 22 may contain an ignitable gas generating material which, when ignited, rapidly generates a large volume of gas. The inflator 22 may alternatively contain a stored quantity of pressurized inflation fluid, or a combination of pressurized inflation fluid and ignitable material for heating the inflation fluid.

The inflator 22 is included in an electrical circuit 36. The electrical circuit 36 further includes a power source 37, which is preferably the vehicle battery and/or a capacitor, and a normally open switch 38. The switch 38 is part of a sensor 40 which senses a condition indicating the occurrence of a vehicle collision. The collision-indicating condition may comprise, for example, sudden vehicle deceleration caused by a collision. If the collision-indicating condition is above a predetermined threshold, it indicates the occurrence of a collision for which inflation of the air bag 12 is desired to protect an occupant of the vehicle. The sensor 40 then closes the switch 38, and the inflator 22 is actuated electrically.

When the inflator 22 is actuated, it emits a large volume of inflation fluid into the reaction canister 24. The reaction canister 24 directs the inflation fluid from the inflator 22 into the air bag 12 to inflate the air bag 12. As the air bag 12 begins to inflate, it moves rapidly outward through the chute 35 and forcefully against the deployment door 32. The air bag 12 then pivots the deployment door 32 outward from the closed position to the opened position. As the air bag 12 continues to inflate, it moves outward into the vehicle occupant compartment 14 past the deployment door 32.

Figure 3:
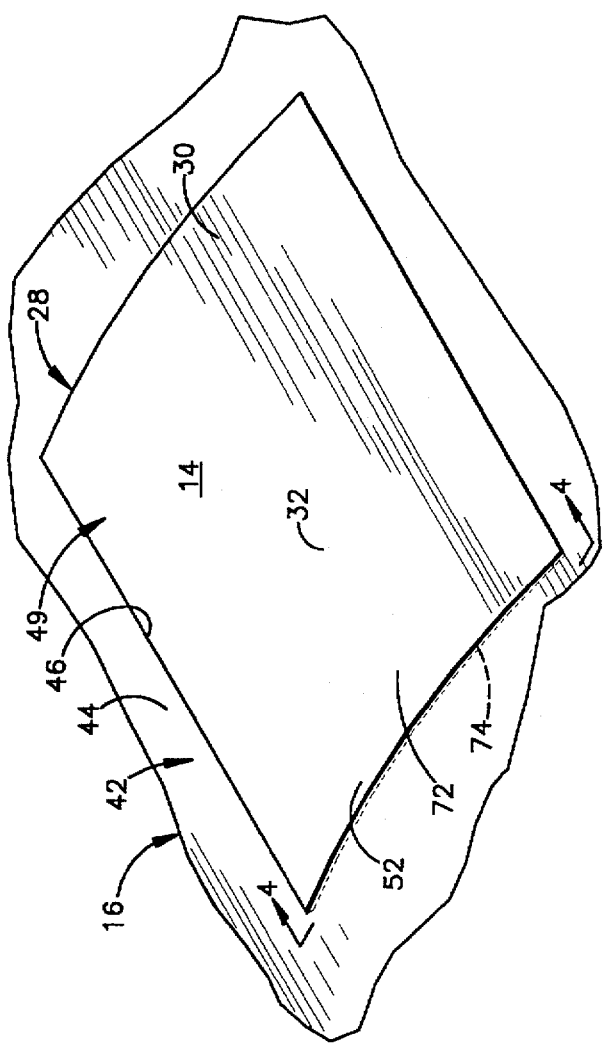
FIG. 3 is a perspective view of parts shown in FIG. 1.

In the embodiment of the present invention shown in FIGS. 1 and 2, the air bag module 20 is mounted in the instrument panel 16 in an arrangement known as a top mount. The air bag 12 is thus inflated outward from an upper portion 42 of the instrument panel 16 which is known as a topper pad. As shown in FIG. 3, the topper pad 42 has an upper surface 44 and an inner edge surface 46. The upper surface 44 faces upward into the vehicle occupant compartment 14, and thus faces partially toward the vehicle windshield 48 (FIGS. 1 and 2). The inner edge surface 46 defines a rectangular opening 49. The deployment panel 30 on the deployment door assembly 28 also is rectangular, and extends fully across the opening 49 in the topper pad 42 to continue the contour of the topper pad 42 across the opening 49. The deployment door 32 thus faces partially toward the windshield 48. More specifically, the air bag 12 is inflated at a deployment angle A1 (FIG. 2), which is measured from a vertical line and which directs the air bag 12 into contact with the windshield 48. Tethers or the like (not shown) can be used to control interaction of the inflating air bag 12 with the windshield 48 in any suitable manner known in the art.

Figure 4:
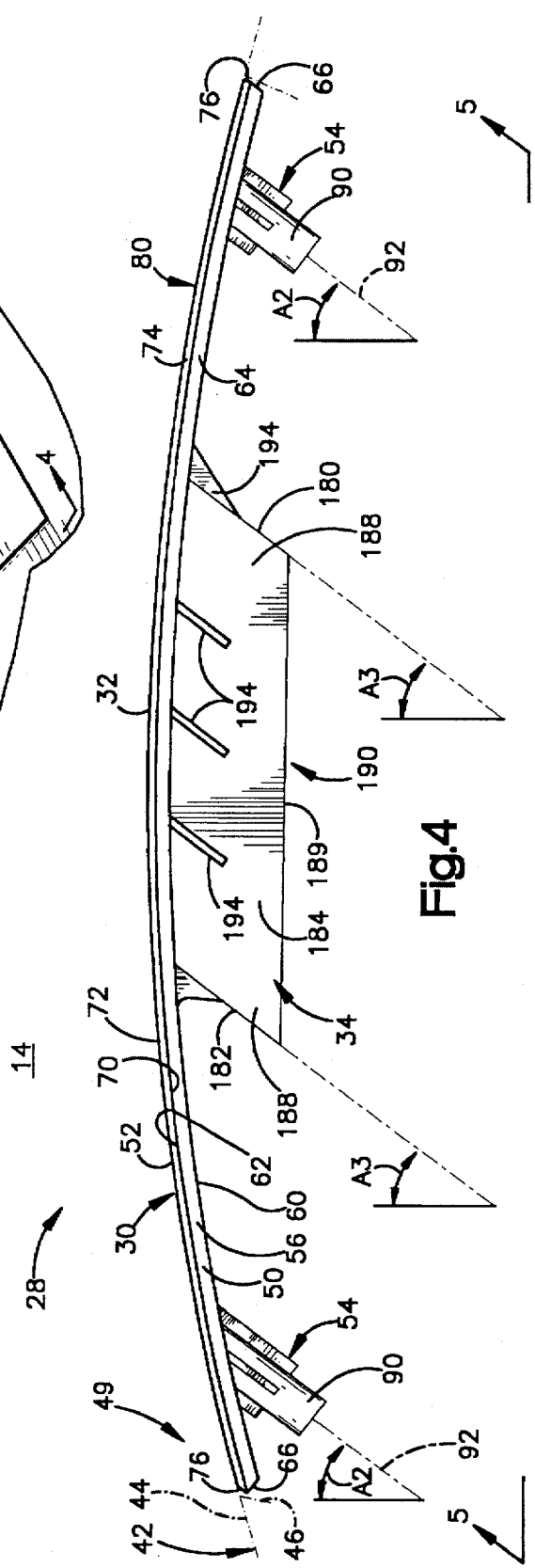
FIG. 4 is a view taken on line 4—4 of FIG. 3.

The deployment door assembly 28 is a part which is defined by two pieces that are joined together. As shown in FIG. 4, the two pieces which together define the deployment door assembly 28 are a substrate 50 and an outer layer 52. The substrate 50 and the outer layer 52 are preferably formed and joined together in a molding process which is set forth in copending U.S. patent application Ser. No. 08/488265, filed Jun. 7, 1995, entitled "Process and Apparatus for Manufacturing a Deployment Door Assembly."

The substrate 50 is a continuous piece of material which, in the preferred embodiment, is plastic. The plastic material of which the substrate 50 is formed may have any suitable composition known in the art. The substrate 50 includes the base 34, and further includes a plurality of mounting bosses 54 for mounting the deployment door assembly 28 on the instrument panel 16. In the preferred embodiment, the outer layer 52 also is a continuous piece of a plastic material which may have any suitable composition known in the art. However, the plastic material of the outer layer 52 is preferably less rigid than the plastic material of the substrate 50. The outer layer 52 overlies a panel portion 56 of the substrate 50. The outer layer 52 and the substrate panel 56 together define the deployment panel 30.

Figure 5:
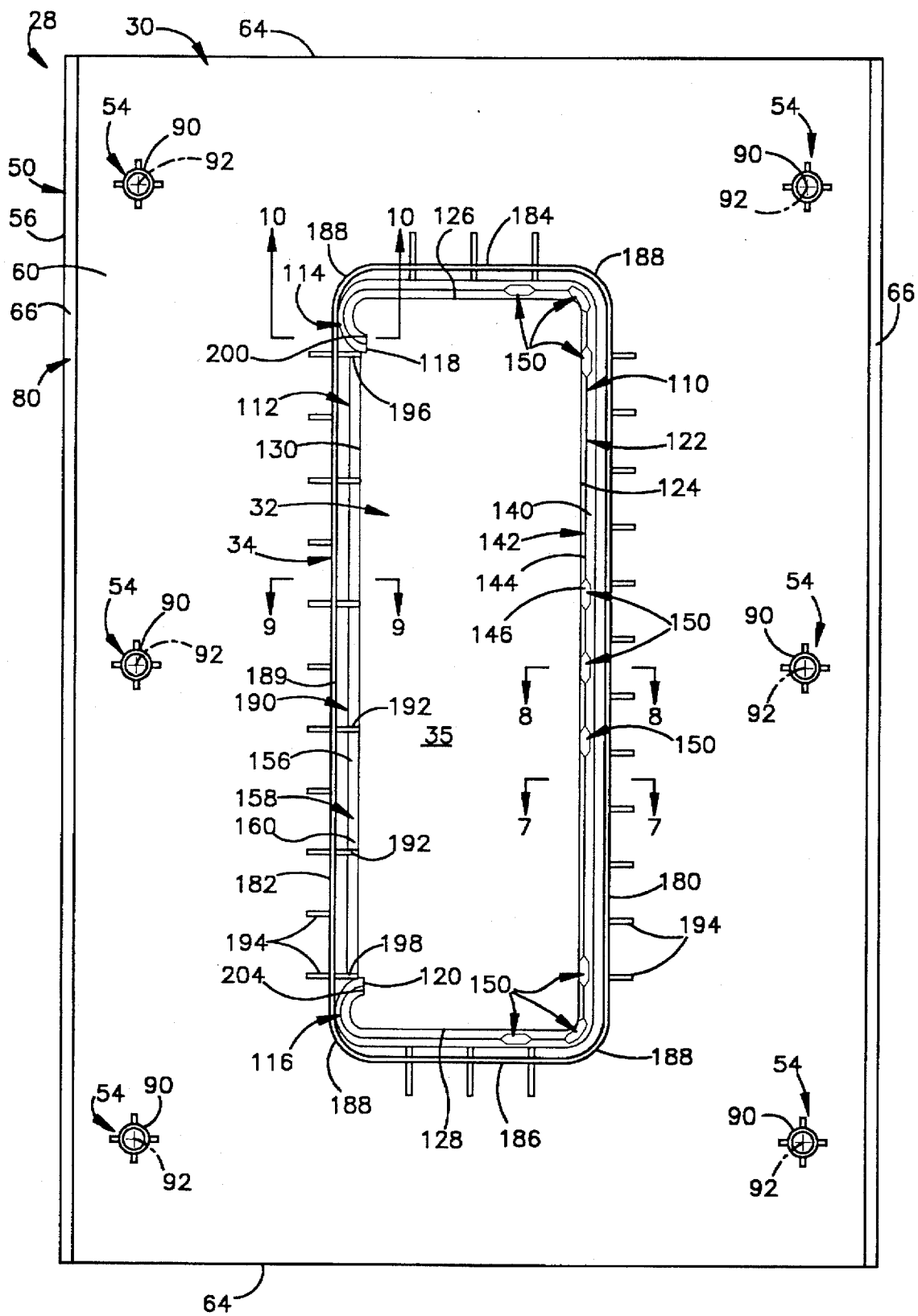
FIG. 5 is a view taken on line 5—5 of FIG. 4.

The substrate panel 56 has oppositely facing inner and outer side surfaces 60 and 62. A peripheral edge surface 64 of the substrate panel 56 fully surrounds the inner and outer side surfaces 60 and 62. As shown in FIG. 5, a pair of beveled portions 66 of the edge surface 64 extend fully along the length of the substrate panel 56.

The outer layer 52 similarly has oppositely facing inner and outer side surfaces 70 and 72 surrounded by a peripheral edge surface 74. The edge surface 74 of the outer layer 52 extends alongside, and is longitudinally coextensive with, the edge surface 64 of the substrate panel 56. A pair of beveled portions 76 of the edge surface 74 lie in planes that are parallel to each other. The beveled portions 76 of the edge surface 74 extend alongside the beveled portions 66 of the edge surface 64. Accordingly, the deployment panel 30 has a peripheral edge surface 80 which is defined in part by each of the adjacent peripheral edge surfaces 64 and 74. The peripheral edge surface 80 of the deployment panel 30 is shaped to mate with the surrounding inner edge surface 46 of the topper pad 42, as indicated in FIGS. 3 and 4.

The outer layer 52 has a constant thickness between the inner and outer side surfaces 70 and 72. The inner side surface 70 of the outer layer 52 fully covers the outer side surface 62 of the substrate panel 56 in overlying surface contact. As shown in FIG. 4, the inner and outer side surfaces 70 and 72 of the outer layer 52 are slightly offset from each other at the beveled portions 76 of the peripheral edge surface 74, but have the same size, shape, and contour. The outer side surface 72 extends fully across the opening 49 in the topper pad 42, as shown in FIG. 3. Additionally, the texture and/or the color of the outer side surface 72 is preferably complimentary to that of the surrounding surface 44 of the topper pad 42. The outer side surface 72 thus continues the trim theme of the topper pad 42 across the opening 49. In accordance with this feature of the present invention, the plastic material of the outer layer 52 may have the same hardness as the plastic material of the topper pad 42.

As shown in FIGS. 4 and 5, the mounting bosses 54 project inward from the deployment panel 30 at locations between the base 34 and the peripheral edge surface 80. The mounting bosses 54 are integral portions of the substrate 50, and project inward from the inner side surface 60 of the substrate panel 56. Each mounting boss 54 has a cylindrical outer surface 90 centered on a respective axis 92. The axes 92 are generally parallel to each other. When the deployment door assembly 28 is mounted on the instrument panel 16, as shown in FIG. 4, each axis 92 is inclined from a vertical line at an angle A2. The angles A2 are equal to each other, and are equal to the deployment angle A1 (FIG. 2) of the air bag 12.

Figure 6A:
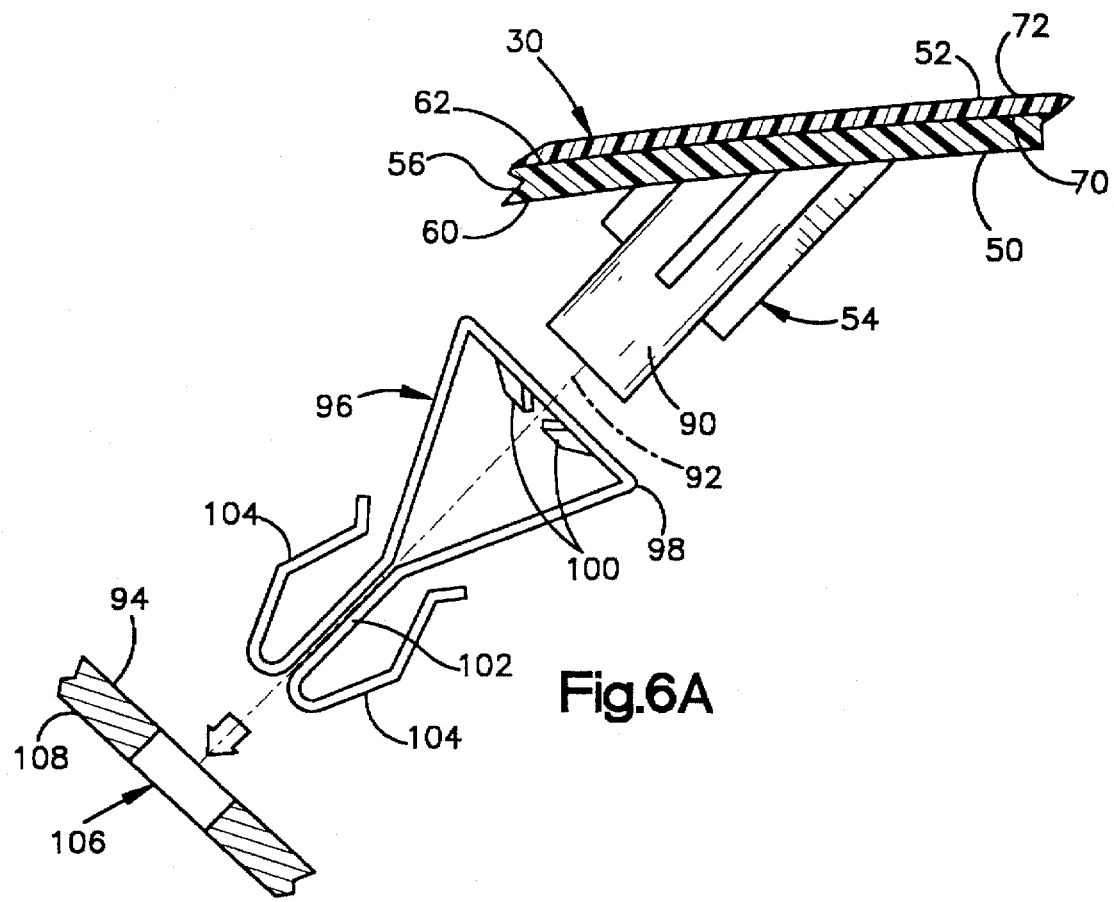
FIGS. 6A and 6B are partial side views showing parts of the apparatus of FIG. 1.
Figure 6B:
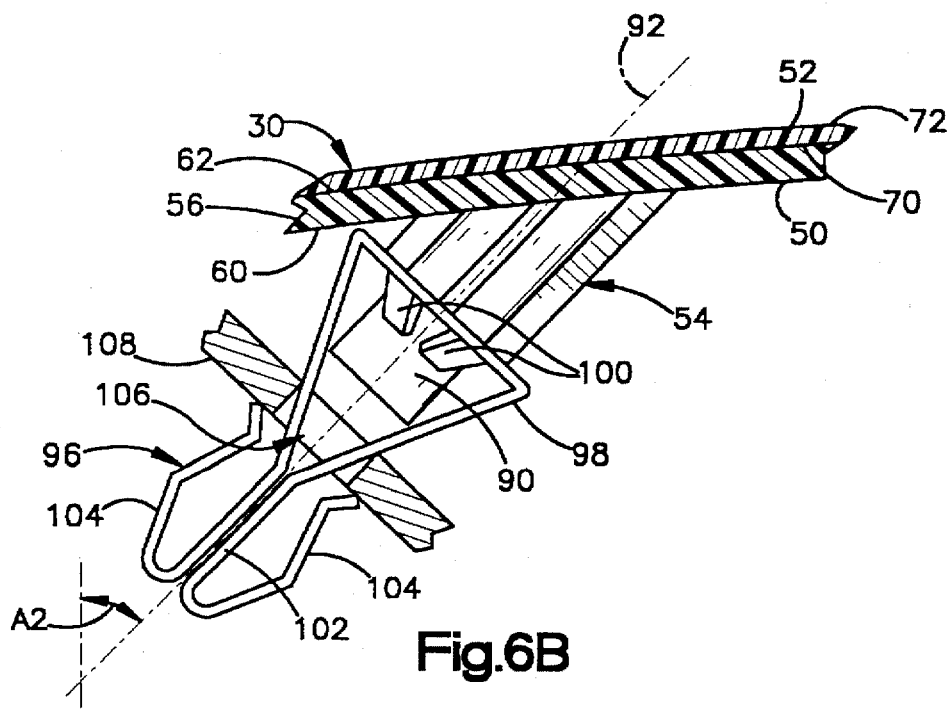

The deployment door assembly 28 is fastened to portions 94 of the instrument panel 16 which are spaced from the reaction canister 24, as shown in FIG. 1. Each mounting boss 54 is fastened directly to a corresponding portion 94 of the instrument panel 16 by a corresponding fastener 96, as shown in FIGS. 6A and 6B. Each fastener 96 has a head 98 with a plurality of barbs 100, and has a stem 102 with a pair of spring arms 104.

When the head 98 of a fastener 96 is received over the corresponding mounting boss 54, as shown in FIG. 6B, the barbs 100 cut into the mounting boss 54 at the cylindrical outer surface 90 so as to block removal of the fastener 96 from the mounting boss 54. The stem 102 of the fastener 96 is receivable through an aperture 106 in the corresponding portion 94 of the instrument panel 16, as indicated by the arrow shown in FIG. 6A. When the stem 102 is moved through the aperture 106, the spring arms 104 are first deflected toward each other, and subsequently move resiliently away from each other to the positions in which they are shown in FIG. 6B. The spring arms 104 then engage an inner surface 108 of the corresponding portion 94 of the instrument panel 16 so as to block removal of the stem 102 from the aperture 106. Each fastener 96 fastens the corresponding mounting boss 54 securely to the instrument panel 16 in this manner. Although the foregoing structures of the mounting bosses 54 and the fasteners 96 are preferred, any suitable alternative structures may be used.

As best shown in FIG. 5, the deployment door 32 has a generally rectangular peripheral shape and is located at the center of the deployment panel 30. The deployment door 32 could be offset from the center of the deployment panel 30, depending upon considerations such as the orientation of the topper pad 42 relative to the vehicle occupant compartment 14, and/or the deployment angle A1 (FIG. 2) of the air bag 12. In any case, the deployment door 32 is spaced fully from the peripheral edge surface 80 of the deployment panel 30.

The peripheral shape of the deployment door 32 is defined by a stress riser 110 and a hinge 112 which together extend fully around the perimeter of the deployment door 32. The stress riser 110 has first and second opposite end portions 114 and 116. The opposite end portions 114 and 116 extend along semi-circular, hook-shaped paths to respective opposite terminal ends 118 and 120 of the stress riser 110. A major portion 122 of the stress riser 110 extends between the end portions 114 and 116 in a U-shaped path extending along three sides of the deployment door 32. The major portion 122 of the stress riser 110 thus defines one long side 124 and two short sides 126 and 128 of the deployment door 32. The hinge 112 extends in a straight line between the opposite end portions 114 and 116 of the stress riser 110. The hinge 112 thus defines another long side 130 of the deployment door 32.

The stress riser 110 is defined in part by the substrate panel 56, and in part by the outer layer 52. As best shown in FIG. 7, a recessed surface 140 of the substrate panel 56 defines a groove 142. The groove 142 extends along the entire length of the stress riser 110, and has a depth extending from the inner side surface 60 of the substrate panel 56 toward the outer side surface 62. A lower portion 144 of the stress riser 110 is defined by the relatively thin plastic material of the substrate panel 56 which is located between the recessed surface 140 and the outer side surface 62. An upper portion 146 of the stress riser 110 is defined by the adjacent plastic material of the outer layer 52 which extends fully between the inner and outer side surfaces 70 and 72 of the outer layer 52. Importantly, the contour of the outer side surface 72 is not affected by the structure of the stress riser 110. The outer side surface 72 thus extends fully across and around the deployment door 32 without interruption at the boundaries of the deployment door 32, as shown in FIG. 3, so that the outline of the deployment door 32 is not visible from the vehicle occupant compartment 14.

A plurality of initiator openings 150 are spaced apart along the length of the stress riser 110, as shown in FIG. 5. As best shown in FIG. 8, each initiator opening 150 extends through the substrate panel 56 at the bottom of the groove 142. Each initiator opening 150 thus interrupts the stress riser 110 at the lower portion 144 (FIG. 7) of the stress riser 110.

The hinge 112 is somewhat similar to the stress riser 110 in that the hinge 112 is defined in part by the substrate panel 56 and in part by the outer layer 52. As best shown in FIG. 9, a slightly recessed surface 156 of the substrate panel 56 defines a shallow groove 158. The groove 158 extends along nearly the entire length of the hinge 112 between the opposite end portions 114 and 116 (FIG. 5) of the stress riser 110. The width of the hinge 112 is approximately equal to the width of the groove 158. A lower portion 160 of the hinge 112 is defined by the relatively thin plastic material of the substrate panel 56 which is located between the recessed surface 156 and the outer side surface 62. An upper portion 162 of the hinge 112 is similarly defined by the adjacent plastic material of the outer layer 52 which extends fully between the inner and outer side surfaces 70 and 72 of the outer layer 52. The two portions 160 and 162 of the hinge 112 together define the thickness of the hinge 112.

The thickness of the hinge 112 is somewhat less than the thickness of the adjacent portions of the deployment panel 30 on opposite sides of the groove 158. This promotes bending at the hinge 112 when the inflating air bag 12 opens the deployment door 32, as described fully below. However, the hinge 112 is both wider and thicker than the stress riser 110 (FIG. 7). This helps to ensure that the force of the inflating air bag 12 ruptures the deployment panel 30 at the stress riser 110 rather than at the hinge 112. Such rupturing also is described fully below. Like the stress riser 110, the hinge 112 does not affect the contour of the outer side surface 72 of the outer layer 52.

The base 34 of the deployment door assembly 28 projects inward from the substrate panel 56. The base 34 has a generally rectangular shape defined by a pair of parallel side walls 180 and 182 and a pair of parallel end walls 184 and 186. One side wall 180 extends closely alongside the stress riser 110 adjacent to the first long side 124 of the deployment door 32. The other side wall 182 extends closely alongside the hinge 112 adjacent to the second long side 130 of the deployment door 32. The end walls 184 and 186 extend closely alongside the stress riser 110 at the short sides 126 and 128, respectively, of the deployment door 32. The four corners of the base 34 are closed by four curved corner walls 188 which together join the other base walls 180, 182, 184 and 186 to each other. Accordingly, the base 34 closely surrounds the deployment door 32, the stress riser 110, and the hinge 112. Moreover, a lower edge surface 189 of the base 34 defines an opening 190 which extends fully across the base 34. The opening 190 defines an inner end of the chute 35. The size and shape of the opening 190 at the inner end of the chute 35 are approximately equal to the size and shape of the deployment opening 27 at the outer end 26 of the reaction canister 24 (FIG. 1).

When the deployment door assembly 28 is mounted on the instrument panel 16 (FIG. 4), the end walls 184 and 186 of the base 34 are substantially vertical. However, each of the side walls 180 and 182 is inclined from a vertical plane at an angle A3. The angles A3 are equal to each other, and are equal to the deployment angle A1 (FIG. 2) of the air bag 12.

The substrate 50 further includes a plurality of triangular gussets extending between the substrate panel 56 and the base 34. These include inner gussets 192 at the inside of the base 34, and outer gussets 194 at the outside of the base 34. The inner gussets 192 extend across the hinge 112 and are perpendicular to the hinge 112. A first inner gusset 196 adjoins the first terminal end 118 of the stress riser 110 at the first hook-shaped end portion 114 of the stress riser 110. A second inner gusset 198 likewise adjoins the second terminal end 120 of the stress riser 110 at the second hook-shaped end portion 116 of the stress riser 110.

When the air bag 12 is inflated upon the occurrence of a vehicle collision, as described above with reference to FIGS. 1 and 2, the base 34 of the deployment door assembly 28 directs the air bag 12 to move outward through the chute 35 from the deployment opening 27 to the deployment door 32. As the air bag 12 inflates and expands outward through the chute 35, the surrounding walls 180–188 of the base 34 constrain the air bag 12 to remain substantially within the perimeter of the deployment door 32. The air bag 12 is thus directed to move against the inner side surface 60 of the substrate panel 56 at the deployment door 32. The inflation fluid in the air bag 12 then causes the air bag 12 to apply a fluid pressure force to the deployment door 32 at the inner side surface 60. This induces stress in the stress riser 110 at the three sides 124, 126 and 128 of the deployment door 32. When the stress reaches a predetermined elevated level, the stress riser 110 ruptures so that a tear propagates throughout the length of the stress riser 110. The deployment door 32 is then released for pivotal movement about the hinge 112 from the closed position of FIG. 1 to the opened position of FIG. 2.

The stress riser 110 first ruptures at the locations of the initiator openings 150 (FIG. 5). This is because the stress is concentrated in the upper portion 146 (FIG. 8) of the stress riser 110 at those locations. The stress riser 110 thus begins to rupture along the middle of the first long side 124 of the deployment door 32, and also at the corners of the deployment door 32 between the first long side 124 and the two short sides 126 and 128. This causes the stress riser 110 to rupture fully around the three sides 124, 126 and 128 of the deployment door 32 adjacent to the stress riser 110 before the stress can cause undesirable rupturing of the plastic material along the fourth side 130 adjacent to the hinge 112.

In accordance with the foregoing feature of the present invention, the stress riser 110 is constructed so that the tear is stopped at the terminal ends 118 and 120 of the stress riser 110. As shown in FIG. 10, the substrate panel 56 has a surface 200 in a plane 202 which is perpendicular to the opposite side surfaces 60 and 62. The surface 200 defines an end of the groove 142. Therefore, the first terminal end 118 of the stress riser 110 is defined where the plane 202 intersects the upper and lower portions 146 and 144 of the stress riser 110. Since the plane 202 extends through the full thickness T of the deployment panel 30, the full thickness T of the plastic material is provided to resist propagation of the tear beyond the first terminal end 118. The second terminal end 120 (FIG. 5) of the stress riser 110 is likewise defined by another planar surface 204 at the opposite end of the groove 142. Additionally, the hook-shaped paths of the opposite end portions 114 and 116 of the stress riser 110 direct the tear to propagate in directions that turn away from the hinge 112. This helps to ensure that the hinge 112 remains intact and that the bending stresses induced in the deployment door 32 are concentrated at the hinge 112. Further in accordance with this feature of the present invention, the first and second inner gussets 196 and 198 are located so as to block propagation of the tear in directions extending along the hinge 112.

As described above, each of the side walls 180 and 182 of the base 34 is inclined from a vertical plane at an angle A3, and the angles A3 are equal to the deployment angle A1 of the air bag 12. Accordingly, each of the side walls 180 and 182 directs the air bag 12 to move toward and against the deployment door 32 at the deployment angle A1. The angles A2 at the mounting bosses 54 also are equal to the deployment angle A1. The fluid pressure force applied to the deployment panel 30 by the air bag 12 thus acts predominantly in a direction parallel to the axes 92 of the mounting bosses 54. This minimizes bending or twisting in the mounting bosses 54 and the fasteners 96 so that the mounting bosses 54 and the fasteners 96 remain securely connected to each other, and to the instrument panel 16, as shown in FIG. 6B. Additionally, since the angles A1, A2 and A3 are equal to each other, the mounting bosses 54 and the base 34 can be removed together from a mold cavity in a single direction. The gussets 192 and 194 are also aligned accordingly. This simplifies the process of forming the substrate 50 as a continuous piece of plastic material.

A deployment door assembly 220 comprising a second embodiment of the present invention is shown partially in FIG. 11. The partial view of the deployment door assembly 220 shown in FIG. 11 corresponds with the partial view of the deployment door assembly 28 shown in FIG. 10. As indicated by the same reference numbers used in FIGS. 10 and 11, the deployment door assembly 220 has many parts that are substantially the same as corresponding parts of the deployment door assembly 28. Such parts include a substrate 50 and an outer layer 52 which together define a deployment panel 30 with a deployment door 32. However, the deployment door assembly 220 has a stress riser 222 which differs from the stress riser 110 in the deployment door assembly 28. As shown in FIG. 11, the depth of the groove 142 gradually decreases to zero along the length of a tapered end portion 224 of the recessed surface 140. The stress riser 222 gradually increases in thickness along the length of the tapered end portion 224, and has a terminal end 228 with the full thickness T of the deployment panel 30. Accordingly, the stress riser 222 ends gradually so that stresses are distributed throughout the full thickness T at the terminal end 228 of the stress riser 222. Such distribution of stresses helps to ensure that the tear will not propagate into the deployment door 32 beyond the terminal end 228 of the stress riser 222.

A deployment door assembly 300 comprising a third embodiment of the present invention is shown in FIGS. 12 and 13. The views of the deployment door assembly 300 shown in FIGS. 12 and 13 correspond with the views of the deployment door assembly 28 shown in FIGS. 4 and 7. The deployment door assembly 300 is thus shown to be a single part defined by a deployment panel 302 and a base 304 which are joined together.

The deployment panel 302 has a peripheral edge surface 306 and an outer side surface 308. The surfaces 306 and 308 are designed to close an opening in a topper pad on a vehicle instrument panel in the same manner as described above with reference to the deployment panel 30. The deployment panel 302 also includes a deployment door 310 which is bounded on three sides by a stress riser 312 (FIG. 13). The deployment door 310, the stress riser 312, and an associated hinge (not shown) are substantially similar to the corresponding parts of the deployment panel 30 described above. However, unlike the deployment panel 30, the deployment panel 302 is not defined by a substrate and an outer layer. Instead, the deployment panel 302 is defined by one continuous piece of plastic material. A plurality of mounting bosses 316 project inward from an inner side surface 318 of the deployment panel 302. The mounting bosses 316 are substantially the same as the mounting bosses 54 described above, and are preferably formed integrally with the deployment panel 302.

A rim portion 320 of the deployment panel 302 projects inward from the inner side surface 318. The rim portion 320 closely surrounds the deployment door 310, as shown partially in FIG. 13. A plurality of gussets 324 are formed as integral portions of the deployment panel 302. The gussets 324 extend between the inner side surface 318 and the rim portion 320, and are preferably located both inside and outside the base 304 in the same manner as described above with reference to the inner and outer gussets 192 and 194, respectively.

The base 304 of the deployment door assembly 300 is defined by a continuous piece of plastic material that is preferably harder than the plastic material of the deployment panel 302. Like the base 34 described above, the base 304 has a generally rectangular shape defined by a pair of long side walls 330, a pair of short side walls 332, and four curved corner walls 334. An upper end portion 336 of the base 304 is embedded in, and bonded to, the rim portion 320 of the deployment panel 302. A lower edge surface 338 of the base 304 defines an open end of a chute 340. The chute 340 (FIG. 13) directs an air bag to move against the deployment door 310 at a deployment angle A4 (FIG. 12).

The present invention has been described with reference to preferred embodiments. From the foregoing description of the invention, those skilled in the art will perceive improvements, changes and modifications. For example, the shapes and sizes of the deployment door and the deployment panel could vary. The deployment door assembly could be defined by a single continuous piece of material, rather than by two such pieces that are joined together. A greater number of continuous pieces also could be used. The deployment door assembly could also have a different location on the instrument panel, such as a mid-mount location. Moreover, a vehicle occupant restraint system may include one or more air bags that inflate upon the occurrence of front, rear, and/or side impacts to the vehicle. The air bags can be mounted in parts of the vehicle other than the instrument panel. Such other parts of the vehicle include, for example, the doors, the pillars, the roof, and the seats. A deployment door assembly constructed in accordance with the present invention could be used with an air bag and the corresponding vehicle trim structure at any of those locations. Such improvements, changes and modifications within the skill of the art are intended to be covered by the appended claims.

Having described the invention, the following is claimed:

1. Apparatus for covering an inflatable occupant restraint contained in a canister in a vehicle, said apparatus comprising:

a part having a panel portion, wall portions, and mounting portions;

said panel portion comprising means for closing an opening in the vehicle, said panel portion having a peripheral edge surface and including a deployment door spaced fully from said peripheral edge surface;

said wall portions comprising means for directing the inflatable restraint to move outward from the canister toward said deployment door when the inflatable restraint is inflating, said wall portions surrounding said deployment door and projecting inward from said panel portion;

said mounting portions comprising means for mounting said part on the vehicle at locations spaced from the canister, said mounting portions projecting inward from said panel portion at locations between said wall portions and said peripheral edge surface;

said part comprising a continuous piece of a first plastic material which includes said wall portions, said part further comprising a continuous piece of a second, less rigid plastic material which includes said panel portion;

said continuous piece of said second plastic material further including said mounting portions of said part.

2. Apparatus for covering an inflatable occupant restraint contained in a canister in a vehicle, said apparatus comprising:

a part having a panel portion, wall portions, and mounting portions;

said panel portion comprising means for closing an opening in the vehicle, said panel portion having a peripheral edge surface and including a deployment door spaced fully from said peripheral edge surface;

said wall portions comprising means for directing the inflatable restraint to move outward from the canister toward said deployment door when the inflatable restraint is inflating, said wall portions surrounding said deployment door and projecting inward from said panel portion;

said mounting portions comprising means for mounting said part on the vehicle at locations spaced from the canister, said mounting portions projecting inward from said panel portion at locations between said wall portions and said peripheral edge surface;

said panel portion of said part including means for defining an elongated stress riser, said stress riser extending partially around said deployment door and being rupturable to define an elongated tear, said stress riser having opposite end portions, each of said end portions extending along a hook-shaped path to a corresponding terminal end of said stress riser;

said panel portion of said part further including means for defining an elongated hinge, said hinge extending longitudinally between said opposite end portions of said stress riser, said part including blocking means for blocking said tear from propagating beyond said terminal ends of said stress riser in directions extending along said hinge;

said blocking means comprising a pair of gussets extending across said hinge at locations adjacent to said opposite end portions of said stress riser.

3. Apparatus for covering an inflatable occupant restraint contained in a canister in a vehicle, said apparatus comprising:

a first continuous piece of plastic material defining a substrate, said substrate having a panel portion and wall portions;

said panel portion comprising means for closing an opening in the vehicle, said panel portion having a peripheral edge surface and including means for defining boundaries of a deployment door which is spaced fully from said peripheral edge surface, said panel portion further having oppositely facing inner and outer side surfaces bounded by said peripheral edge surface and extending across and around said deployment door;

said wall portions comprising means for directing the inflatable restraint to move outward from the canister toward said deployment door when the inflatable restraint is inflating, said wall portions surrounding said deployment door and projecting inward from said panel portion; and a second continuous piece of plastic material defining an outer layer, said outer layer having oppositely facing inner and outer side surfaces with the same size, shape, and contour, said inner side surface of said outer layer covering said outer side surface of said substrate in overlying surface contact, said outer side surface of said outer layer comprising means for continuing a trim theme of the vehicle across and around said deployment door;

said substrate and said outer layer together including means for defining an elongated stress riser, said stress riser extending partially around said deployment door and being rupturable to define an elongated tear, said stress riser having opposite end portions, each of said end portion extending along a hook-shaped path to a corresponding terminal end of said stress riser;

said substrate and said outer layer together including means for defining an elongated hinge, said hinge extending longitudinally between said opposite end portions of said stress riser, said panel portion of said substrate further including blocking means for blocking said tear from propagating beyond said terminal ends of said stress riser in directions extending along said hinge;

said substrate including gussets extending between said panel portion and said wall portions, said blocking means comprising a pair of said gussets which extend across said hinge at locations adjacent to said opposite end portions of said stress riser.

4. Apparatus for covering an inflatable occupant restraint contained in a canister in a vehicle, said apparatus comprising:

a part having a panel portion, wall portions, and mounting portions;

said panel portion comprising means for closing an opening in the vehicle, said panel portion having a peripheral edge surface and including a deployment door spaced fully from said peripheral edge surface;

said wall portions comprising means for directing the inflatable restraint to move outward from the canister toward said deployment door when the inflatable restraint is inflating, said wall portions surrounding said deployment door and projecting inward from said panel portion;

said mounting portions comprising means for mounting said part on the vehicle at locations spaced from the canister within the opening in the vehicle, said mounting portions projecting inward from said panel portion at locations between said wall portions and said peripheral edge surface;

said panel portion of said part including means for defining an elongated stress riser, said stress riser extending partially around said deployment door and being rupturable to define an elongated tear, said means for defining a stress riser including a recessed surface of said panel portion of said part, said recessed surface defining a groove extending along said stress riser and having opposite end portions at opposite end portions of said stress riser, each of said end portions of said groove having a depth which gradually decreases along the corresponding end portion of said stress riser to reach a depth of zero at a corresponding terminal end of said stress riser.

5. Apparatus for covering an inflatable occupant restraint contained in a canister in a vehicle, said apparatus comprising:

a part having a panel portion, wall portions, and mounting portions;

said panel portion comprising means for closing an opening in the vehicle, said panel portion having a peripheral edge surface and including a deployment door spaced fully from said peripheral edge surface;

said wall portions comprising means for directing the inflatable restraint to move outward from the canister toward said deployment door when the inflatable restraint is inflating, said wall portions surrounding said deployment door and projecting inward from said panel portion;

said mounting portions comprising means for mounting said part on the vehicle at locations spaced from the canister within the opening in the vehicle, said mounting portions projecting inward from said panel portion at locations between said wall portions and said peripheral edge surface;

said panel portion of said part including means for defining an elongated stress riser, said stress riser extending partially around said deployment door and being rupturable to define an elongated tear, said panel portion of said part further including means for defining an elongated hinge, said hinge extending longitudinally between opposite end portions of said stress riser, said part including blocking means for blocking said tear from propagating beyond said opposite end portions of said stress riser in directions extending along said hinge;

said blocking means projecting inward from said panel portion at locations between said wall portions and said opposite end portions of said stress riser.

6. Apparatus for covering an inflatable vehicle occupant restraint in a vehicle, said apparatus comprising:

a part having a panel portion including a deployment door and means for defining an elongated stress riser extending partially around said deployment door, said stress riser being rupturable to define an elongated tear under the influence of said restraint;

said means for defining a stress riser including a recessed surface of said panel portion of said part, said recessed surface defining a groove extending along said stress riser and having opposite end portions at opposite end portions of said stress riser, each of said end portions of said groove having a depth which gradually decreases along the corresponding end portion of said stress riser to reach a depth of zero at a corresponding terminal end of said stress riser.

\* \* \* \* \*